United States Patent [19]

Corsette

[11] Patent Number: 4,890,773

[45] Date of Patent: Jan. 2, 1990

[54] VISCOUS PRODUCT DISPENSER

[75] Inventor: Douglas F. Corsette, Los Angeles, Calif.

[73] Assignee: Calmar, Inc., Watchung, N.J.

[21] Appl. No.: 357,899

[22] Filed: May 25, 1989

Related U.S. Application Data

[62] Division of Ser. No. 168,248, Mar. 15, 1988.

[51] Int. Cl.[4] .......................... B67D 5/42; G01F 11/00

[52] U.S. Cl. .................................... 222/380; 222/383; 222/387; 222/515; 222/517

[58] Field of Search .................... 222/380, 387, 402.12, 222/402.13, 511, 515, 517, 207, 209, 256, 257, 259, 260, 340, 341, 383, 386, 390, 391, 505, 385, 401

[56] References Cited

U.S. PATENT DOCUMENTS

| | | | |
|---|---|---|---|
| 4,511,068 | 4/1985 | Bossing | 222/387 X |
| 4,515,298 | 5/1985 | Czech | 222/380 |
| 4,629,097 | 12/1986 | Moore | 222/387 X |
| 4,657,161 | 4/1987 | Endo et al. | 222/387 X |
| 4,679,712 | 7/1987 | Foster et al. | 222/402.11 X |
| 4,753,373 | 6/1988 | Seager | 222/402.12 X |
| 4,776,496 | 10/1988 | Battegazzore | 222/387 X |
| 4,805,809 | 2/1989 | Harris | 222/383 X |
| 4,821,926 | 4/1989 | Battegazzore | 222/380 X |
| 4,830,228 | 5/1989 | Fillmore | 222/387 X |

FOREIGN PATENT DOCUMENTS

| | | | |
|---|---|---|---|
| 3104726 | 8/1982 | Fed. Rep. of Germany | 222/386 |
| 2594419 | 2/1986 | France . | |

*Primary Examiner*—Kevin P. Shaver
*Attorney, Agent, or Firm*—Watson, Cole, Grindle & Watson

[57] ABSTRACT

A two-chamber viscous product dispenser which includes a stationary, transversely offset, longitudinally extending discharge spout. A depressible discharge pump actuator is mounted on the container and has extended and retracted positions. A spring biased cover having a cap overlies the discharge opening of the spout and a lever at the opposite end is in movable engagement with the actuator. A rib on the spout serves as a fulcrum for the body of the cover such that when the actuator is retracted, the cap uncovers the discharge opening.

5 Claims, 1 Drawing Sheet

VISCOUS PRODUCT DISPENSER

This application is a divisional application of application Ser. No. 168,248 filed Mar. 15, 1988.

BACKGROUND OF THE INVENTION

This invention relates generally to manually operated pump dispensers having particular utility for viscous products such as tooth paste and similar pasty substances.

More specifically, the viscous product dispenser of the invention is of the two-chamber variety having a stationary product discharge spout, one of the chambers being a pump chamber having internal inlet and outlet check valves. And the dispenser may have a spout cover capable of being swung open at the commencement of pumping and returned to a closed position at the termination of pumping.

U.S. Pat. Nos. 4,301,948 and 4,651,904 each disclose a two-chamber viscous product dispenser having a stationary discharge spout and internal valving for the pump chamber.

It is desired to improve upon such internal valving to simplify the valving structure and arrangement within the dispenser to more efficiently and economically valve the viscous product out of the pump chamber during pumping.

U.S. Pat. Nos. 4,684,044 and 4,691,847 each disclose viscous product pump dispenser having a discharge spout which reciprocates during pumping, and having a spout cover which functions as an outlet valve during pumping.

It is desireable to improve upon this type of viscous product dispenser by the provision of a spout cover which need not function as an outlet valve for a stationary spout which is opened and closed upon operation of the pump actuator.

SUMMARY OF THE INVENTION

It is therefore an object of the present invention to provide a viscous product dispenser having a storage compartment and a pump chamber, a stationary discharge spout leading from the pump chamber, a reciprocable piston within the chamber and an improved unitary, internal valve element having an inlet check valve and a simplified outlet check valve for efficiently and reliably valving the discharge product from the pump chamber during pumping.

Another object of the invention is to provide such a viscous product dispenser in which the unitary valve element is more economical to produce and assemble compared to prior art valving of this general type.

A further object of the invention is to provide a viscous product dispenser having a storage compartment and the pump chamber in which a reciprocable piston operates, a stationary discharge spout, and a external spout cover which need not function as an outlet valve but which is opened and closed upon actuation of the piston.

Other objects, advantages and novel features of the invention will become more apparent from the following detailed description of the invention when taken in conjunction with the accompanying drawings.

DETAILED DESCRIPTION OF THE INVENTION

Figure 1:
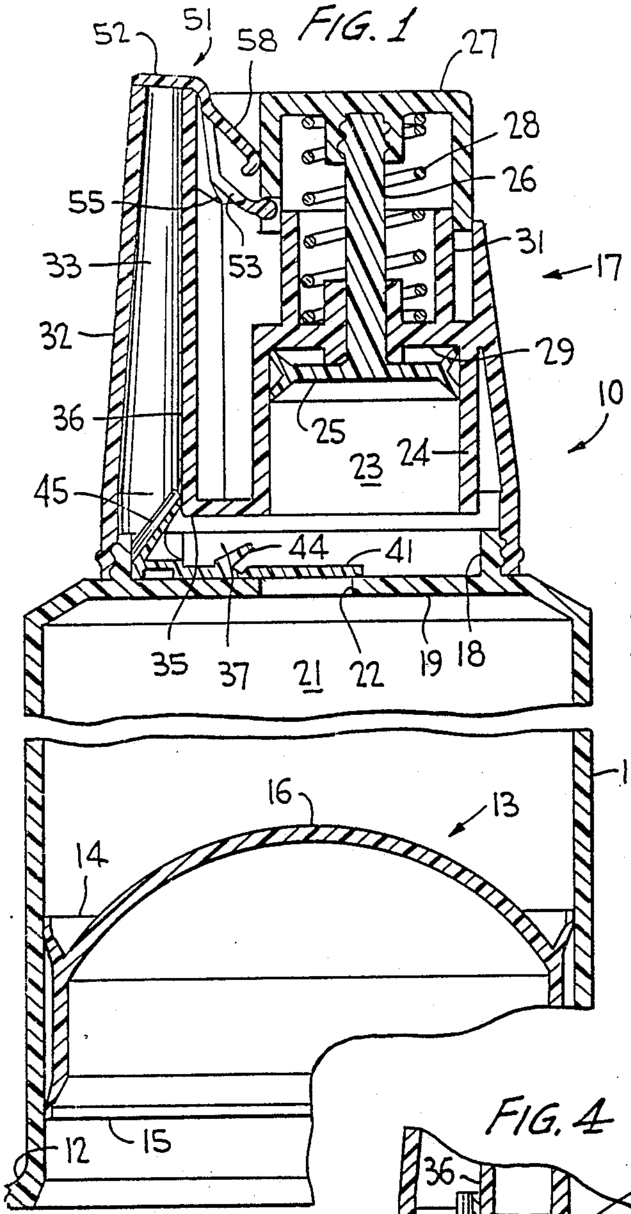
FIG. 1 is a vertical sectional view, partly broken away, of the viscous product dispenser incorporating the features of the invention, shown in a non-pumping position.

Turning now to the drawings wherein like reference characters refer to like and corresponding parts throughout the several views, the dispenser, generally designated 10 in FIG. 1, includes a tubular, cylindrical body 11 open at its lower end 12 to the atmosphere and having a standing base at the lower end. A floating piston 13 makes sealing engagement with the interior wall surface of body 11, the piston being in the form of a cup having annular lips 14 and 15 extending in opposite directions from the rim of the cup. The floating piston functions in the same manner as in the aforementioned prior patents for reducing the volume of the container body during each discharge of product therefrom so that the container retains its original shape while formation of a vacuum or the accumulation of air within the container is prevented.

However, compared to prior floating pistons of this type, wall 16 of piston 13 is dome-shaped, rather than flat, for enhancing smooth and uninterrupted movement of the floating piston upon its inward, incremental advance in response to atmospheric pressure during pump dispensing. For example, the flat wall of a typical floating piston tends to deform or stretch in response to atmospheric pressure which tends to distort one or both annular lip seals 14, 15 which could not only interfere with the smooth, inward advance of the floating piston, but which could affect the tight seal of one or both lip seals.

A head member 17 is mounted on the upper end of the container body as by threaded engagement with an annular rim 18 extending outwardly of an upper, separation wall 19 which defines, together with floating piston 13, a storage compartment 21 for viscous product (not shown) to be dispensed.

The separation wall has an inlet port 22 establishing communication in a valve open position between the storage compartment and a pump chamber 23 defined above the separation wall by the confronting portion of head member 17. The head member includes a pump cylinder 24 containing a reciprocable piston 25 for pump dispensing the product upon piston actuation. A piston stem 26 has an actuator button 27 mounted on its outer end, and a return spring 28 extends between the actuator button and the upper side of a cylinder closing wall 29 for spring biasing the piston to its non-pumping position of FIG. 1. The actuator button is guided on a sleeve 31 which extends outwardly of wall 29.

Head member 17 further includes a longitudinally extending product discharge spout 32 defining a discharge passage 33, the spout being transversely offset from the central axis of the piston. The spout terminates at its outer end in an outlet opening 34, and has a port 35 at its root end located in its wall 36. This port is formed in a transverse passage 37 through which communication is established between pump chamber 23 and discharge passage 33 in the FIG. 2 open position of the outlet valve to be hereinafter described in more detail.

Figure 3:
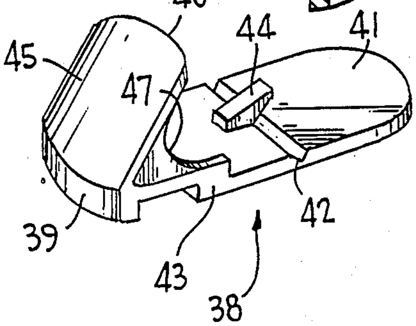
FIG. 3 is a slightly enlarged, perspective view of the unitary valve element of FIGS. 1 and 2.

A unitary valve element 38 (FIG. 3) is supported within the head member on separation wall 19 with its curved end 39 abutting against the curved inner surface of rim 18, as shown in FIG. 1. The element includes an integral inlet check valve which may be in the form of a flap 41 normally overlying inlet port 22 in a valve closed position. The inlet flap valve is integrally formed with the valve element for hinged movement along a V-groove or crimp line 42, or some other hinge line, for movement away from separation wall 19 against which it is seated during each pumping intake stroke. On the upper side of a flat body portion 43 of the valve element may be provided a stop rib or ribs 44 for limiting the swinging opening movement of valve flap 41.

Also extending from the upper side of body portion 43 of the valve element is an integral outlet valve 45 having a curved free end 46 which matches the contour of curved wall 36 against which curved end 46 of the outlet valve is tightly seated in the FIG. 1 position. Wall 36 may otherwise be flat in which case free end 46 is complementarily straight, within the scope of the invention.

Extending between outlet valve 45 and body portion 43 are integrally formed deformable webs 47 (only one of which is visible in FIG. 3) which provide for spring biasing the outlet valve to its closed position of FIG. 1. The webs are capable of stretching or flexing during pumping in response to increased pressure within the pump chamber acting through passage 37 against the inner surface of valve 45 for forcing open the valve into its open position against the spring bias of webs 47, shown in phantom outline in FIG. 2.

Figure 4:
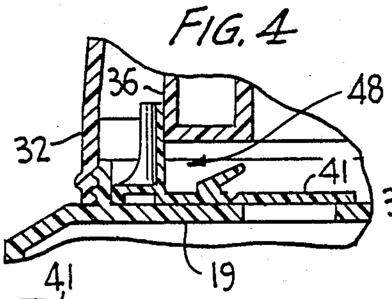
FIG. 4 is a view similar to FIG. 1 of a portion of the dispenser incorporating a unitary valve element according to another embodiment of the invention.
Figure 5:
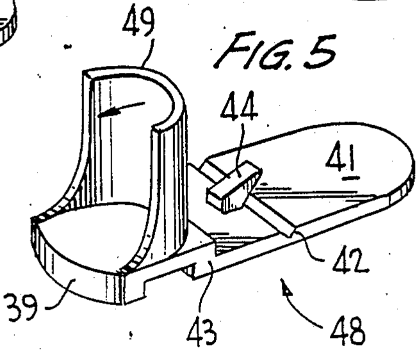
FIG. 5 is a slightly enlarged, perspective view of the unitary valving element of FIG. 4.

Another embodiment of a unitary valve element 48 is shown in FIGS. 4 and 5 as comprising a body portion 42 having a curved end 39 bearing against the inner curved surface of rim 18 and being supported on separation wall 19. Resilient valve element 48 likewise includes an integral inlet flap valve 41 hinged at 42, and a limit stop 44 for the inlet valve, similarly as in valve element 38. However, valve element 48 has an integral outlet valve 49 in the form of a cutaway sleeve of resilient material which is located on flat body portion 43 and which matches the contour of wall 36 of the spout. Outlet valve 49 is of resilient material which inherently spring biases it into its closed position of FIG. 4 for closing port 35. The outlet valve opens in response to pressure from the pump chamber during pumping by deforming in the direction of the arrow shown in FIG. 5.

Before describing the retractable spout covers of the invention, the operation of the dispenser will be described as though the spout cover of FIGS. 1 and 2 were not employed. Assuming pump chamber 23 to be primed with viscous product in the FIG. 1 position, actuator button 27 is manually depressed which increases the pump chamber pressure and forces product against outlet valve 45 via passage 37 causing the valve to swing open to its FIG. 2 position allowing product to be discharged through passage 33 and out through discharge opening 34. Resilient webs 47 are caused to stretch or flex to permit the outlet valve to open against the bias of the inherent spring action of the webs. During the pressure stroke shown in FIG. 2, inlet flap valve 41 is held against its valve seat in its closed position as shown. On the ensuing upstroke of the piston upon release of finger pressure applied to the actuator button, spring 28 returns the piston to its FIG. 1 position establishing a vacuum in the pump chamber which facilitates entry of product from storage compartment 21 into the pump chamber via open inlet port 22, similarly as in dispensers of this type. And, during this suction stroke, outlet valve 45 is held back in its closed position of FIG. 1 owing to the inherent closing spring tendency of webs 47 as assisted by the differential in pressure acting on opposite sides of the outlet valve. During pumping, the floating piston 13 acts a follower piston as it moves incrementally inwardly reducing the volume of the storage compartment as product is suctioned into the pump chamber during each piston suction stroke.

Outlet valve 49 of valve element 48 operates in a similar manner during pumping. Thus, in response to an increase in pump chamber pressure on actuation of the actuator button, outlet valve 49 is deformed from its FIG. 4 position as product presses against its outer curved surface causing it to deform in the direction of the arrow of FIG. 5 to thereby open outlet port 35. The inherent resiliency of outlet valve 49 causes the valve to return to its undeformed condition of FIG. 5 at the end of the discharge stroke and during each suction stroke of the piston as assisted by the differential in pressure on opposite sides of the valve 49.

Figure 2:
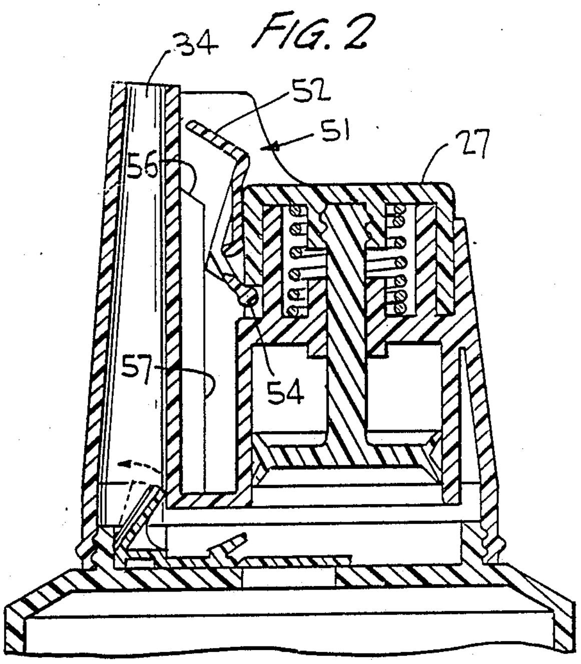
FIG. 2 is a view similar to FIG. 1, further partly broken away, shown in a pumping position.

One embodiment of a spout cover 51 of the invention is shown in FIGS. 1 and 2 capable of being pivotally retracted from its closed position of FIG. 1 to its open position of FIG. 2 during piston actuation. The cover is substantially Z-shaped having a cap 52 at one end overlying discharge opening 34 in the FIG. 1 closed position, and having a lever 53 at its opposite end. The lever is pivotally connected as at 54 to actuator button 27, and the body of the spout cover has a cam projection 55 bearing against an upper end 56 of a longitudinally extending rib 57 located on or adjacent the spout. This end 56 defines a fulcrum for the spout cover about which the cover turns for lifting the cap off the spout upon initial depression of the actuator button. Upon continued depression of actuator 27, projection 55 slides along rib 57 and the spout cover moves together with the actuator button, as shown in FIG. 2. And, the spout cover may have a leaf spring 58 integral with the body of the cover and bearing against a side of the actuator button so as to be compressed when moved into its FIG. 2 position, and resiliently biasing the cap end of the cover in the closed position of FIG. 1 under the restoring force of this spring.

Figure 6:
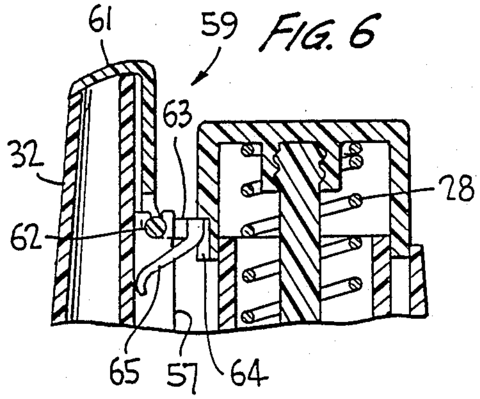
FIG. 6 is a view similar to FIG. 1 of a upper portion of the dispenser incorporating a spout cover in accordance with another embodiment of the invention, as shown in a non-pumping position closed over the spout opening.
Figure 7:
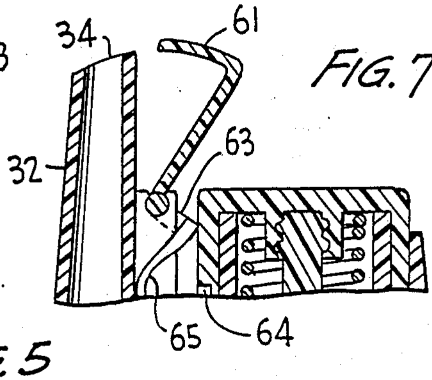
FIG. 7 is a view similar to FIG. 6 showing the spout cover swung open upon pump actuation.

Another embodiment of a spout cover 59 is shown in FIG. 6 and 7 as comprising a substantially Z-shaped spout body having a cap 61 at one end closed over discharge opening 34 of spout 32 as in FIG. 6, and being retractable into its open position of FIG. 7. The spout body is pivotally connected as at 62 to rib 57 which thereby defines a fulcrum about which the spout cover turns upon depression of the actuator button. A lever 63 at the opposite end of the spout body releasably engages the actuator button as it extends into a shallow depression 64 in a side wall of the button. Similarly as in the FIGS. 1 and 2 embodiment, the spout cover may have a leaf spring 65 integral with leg 63, straddling rib 57 and bearing against spout 32 for resiliently biasing the cap end of the cover in the closed position of FIG. 6 under the restoring force of this spring. Thus, the spout cover opens against the force of this spring upon initial depression of the actuator button. Continued depression of the button causes lever 63 to release from depression 64 as the button slides along the lever maintaining it open, as in FIG. 7, through the completion of the pressure stroke of the piston. Release of manual pressure applied to the actuator button returns the piston to its FIG. 6 position under the restoring force of return spring 28 whereupon the restoring force or spring 65 urges the spout cover back to its closed position as lever 63 reengages in depression 64.

Obviously, many other modifications and variations of the present invention are made possible in light of the above teachings. It is therefore to be understood that within the scope of the appended claims the invention may be practiced otherwise than as specifically described.

What is claimed is:

1. A viscous product dispenser, comprising an elongated container having at one end a stationary, transversely offset, longitudinally extending product discharge spout terminating in a discharge opening, a depressible discharge pump actuator mounted on said container adjacent said spout for movement between extended and retracted positions, and a spring biased, pivotable spout cover having a body, a cap at one end of said body overlying said discharge opening when said actuator is in said extended position, and a lever at the opposite end of said body in engagement and movable with said actuator, means on said spout defining a fulcrum for said body, whereby said cover pivots about said fulcrum to uncover said cap from said discharge opening upon movement of said actuator to said retracted position.

2. The dispenser according to claim 1, wherein said lever is pivotally connected to said actuator.

3. The dispenser according to claim 2, wherein said means comprises a longitudinally extending rib on said spout having a free end defining said fulcrum, said rib having an outer edge along which said cover slides, upon movement together with said actuator toward said retracted position.

4. The dispenser according to claim 1, wherein said fulcrum defining means comprises a pivotal interconnection of said cover with said spout.

5. The dispenser according to claim 4, wherein said lever is releaseably engaged with said actuator to facilitate relative sliding movement between said lever and said actuator after said cover pivots about said fulcrum.

* * * * *